United States Patent [19]

Novak

[11] Patent Number: 5,793,176
[45] Date of Patent: Aug. 11, 1998

[54] SPATIAL FEATURE TRACKING IMPEDENCE SENSOR USING MULTIPLE ELECTRIC FIELDS

[75] Inventor: James L. Novak, Albuquerque, N. Mex.

[73] Assignee: Sandia Corporation, Albuquerque, N. Mex.

[21] Appl. No.: 42,292

[22] Filed: Apr. 2, 1993

[51] Int. Cl.⁶ .................................................. H02P 7/00
[52] U.S. Cl. ........................................................ 318/587
[58] Field of Search .......................... 318/568.21, 587, 318/576, 577, 570; 324/371, 354, 225, 207.12, 207.2, 671; 364/513, 474.03, 474.12, 474.29, 474.37

[56] References Cited

U.S. PATENT DOCUMENTS

| | | | |
|---|---|---|---|
| 4,020,918 | 5/1977 | Houskamp et al. | 180/79 |
| 4,282,486 | 8/1981 | Culver et al. | 324/371 |
| 4,310,789 | 1/1982 | Mank et al. | 318/587 |
| 4,558,424 | 12/1985 | Oguchi et al. | 364/513 |
| 4,654,598 | 3/1987 | Arulanandan et al. | 324/354 |
| 4,656,406 | 4/1987 | Houskamp | 318/587 |
| 4,792,755 | 12/1988 | Huschelrath et al. | 324/225 |
| 4,879,499 | 11/1989 | Iwata | 318/568.21 |
| 5,065,093 | 11/1991 | Nauta et al. | 324/207.12 |
| 5,075,626 | 12/1991 | Vail | 324/371 |
| 5,252,919 | 10/1993 | Uemura | 324/207.2 |
| 5,281,921 | 1/1994 | Novak et al. | 324/671 |

Primary Examiner—Jonathan Wysocki
Attorney, Agent, or Firm—Gregory A. Cone

[57] ABSTRACT

Linear and other features on a workpiece are tracked by measuring the fields generated between electrodes arrayed in pairs. One electrode in each pair operates as a transmitter and the other as a receiver, and both electrodes in a pair are arrayed on a carrier. By combining and subtracting fields between electrodes in one pair and between a transmitting electrode in one pair and a receiving electrode in another pair, information describing the location and orientation of the sensor relative to the workpiece in up to six degrees of freedom may be obtained. Typical applications will measure capacitance, but other impedance components may be measured as well. The sensor is designed to track a linear feature axis or a protrusion or pocket in a workpiece. Seams and ridges can be tracked by this non-contact sensor. The sensor output is useful for robotic applications.

19 Claims, 5 Drawing Sheets

SPATIAL FEATURE TRACKING IMPEDENCE SENSOR USING MULTIPLE ELECTRIC FIELDS

The government has rights in this invention pursuant to Contract No. DE-AC04-76DP00789 awarded by the U.S. Department of Energy.

BACKGROUND OF THE INVENTION

This invention concerns location and orientation sensors. More particularly, this invention employs multiple pairs of transmitting and receiving electrodes to track features on a surface in multiple locations and orientations relative to the sensor based on pertubations in the electrical fields caused by a feature on a workpiece.

Large classes of maunfacturing operations require the precise tracking of a gap or seam between mating parts. These processes include welding, dispensing, edge finishing, and painting operations. A robot or other manipulator must be programmed to follow the trajectory of the joint to properly perform the operation. The vast majority of current manufacturing applications accomplishes this by precisely fixturing the mating parts and then "teaching" the location and orientation of the seam to the robot or positioner. In these open-loop techniques, the individual components are also typically overdesigned to prevent changes in the part geometry during the process, such as heat deformation during welding. This open-loop approach works well when the lot sizes are large and the cost of precise forming, machining, fixturing, and teaching can be amortized over many thousands of units. However, this approach is too costly and inflexible for small-volume or agile manufacturing operations.

Seam tracking sensors can provide error signals that the manipulator can use to accurately follow the desired seam in real-time, as the parts are being processed. These data are fed back to the controller which can modify the nominal trajectory to compensate for mismatch in the joint, misalignment of the fixture, and disortion of the workpiece. A wide variety of "disturbances" can be rejected by the control system, resulting in a useful processed part. Because of this, machining tolerances for the mating surfaces, fixture tolerances, and other process parameters can be relaxed, resulting in potentially large cost savings during the fabrication of individual components as well as the completed part.

One type of non-contacting sensor that has been used is an optical system that shines a light onto a liquid surface on the workpiece, typically a weld pool, and senses the harmonic ripples on the surface to give an indication of the liquid-solid interfaces below the top of the weld pool. These systems tend to be very expensive and, due to their optical nature, tend have problems with optical attenuation of the light source and the sensor because of the debris created by the manufacturing process. Also, they cannot provide orientation information.

The sensor system of this invention has been developed to permit the precise location and tracking of features on the surface of a workpiece. Specifically, it was developed to track the seams between workpieces in an application involving placing of brazing paste between the multiple tubes in a complexly curved rocket motor thrust chamber.

SUMMARY OF THE INVENTION

This sensor system uses impedance maeasurements between multiple pairs of electrodes to track and measure features on the surface of a workpiece. One embodiment uses capacitance variations and differential capacitances to permit the measurement and control of sensor lcoation and orientation with respect to the seams on the workpiece. This system comprises a specially designed arrangement of impedance sensing electrodes that are connected to appropriate signal conditioning electronics to measure the capacitive component of the impedance. Other embodiments can measure up to six degrees of freedom while tracking a linear feature on a workpiece by sensing impedance changes between pairs of electrodes.

The first embodiment of the system has four output signals that can be combined to provide tracking in the $\Delta y$ and $\Delta z$ lcoations and the $\Delta \rho$ orientation (rotation about the y-axis) relative to a seam whose longitudinal axis is defined as the x-axis. This system has two pairs of rectangular electrodes, one on each side of a tab that extends down towards the workpiece. The tab is aligned with the x-axis of the seam, and the normals from each of the electrodes face outwards parallel to the y-axis of the seam. An oscillating signal is output from one electode in each pair with the other two electrodes sensing the fields. The field between the electrodes on one side of the tab will primarily sense in the sideways, y-axis, direction. The field between a transmitting electrode in one pair and a sensing electrode in the other pair will primarily sense in the downward, z-axis, direction. By subtracting field data from one of these downward-looking pairs of electrodes from the other, information about the rotation about the y-axis ($\Delta \rho$) can be obtained. Control over this orientation is important to keep the sensor and associated brazing paste dispensing system properly aligned relative to the z-axis as the system follows the curved contours of the workpiece. Addition of these two fields gives information about the height of the sensors ($\Delta z$) above the workpiece. If the field data from the pairs of the electrodes on each side is subtracted from each other, information relating to tracking in the y-direction may be obtained.

By adding further sensors and data processing to the system, information describing up to six degrees of freedom. Five degrees other than the feature axis on the workpiece that is being tracked are useful in tracking linear features in which the x-axis of the sensor is parallel to the linear feature. Six degrees of freedom are needed when the sensor is to track a "dot" feature such as a hole.

DETAILED DESCRIPTION OF THE INVENTION

The components and operations of this invention will be described in the context of a particular embodiment that was developed for a specific application. The following discussion should not be considered as limitative of the true scope of the invention which is set forth in the appended claims.

This embodiment of the capacitive tracking sensor was developed to track seams between tubes used to fabricate the thrust chamber for a rocket engine. The typical Atlas or Delta thrust chamber produced by Rocketdyne has 292 tubes approximately 230 cm long, while the Space Shuttle Main Engine nozzle contains over 1000 tubes. The tubes run longitudinally, carrying fuel along the sides of the thrust chamber during engine operation. The individual tubes are formed with a continuously-varying cross-section to improve fluid dynamics and define the overall chamber shape.

To manufacture a chamber, the loose tubes are first assembled into the final shape. The interstices between the tubes are then filled with nickel powder and silver-palladium alloy paste. In traditional practice these materials are dispensed manually at a fixed rate that is not adjusted to compensate for the varying cross-section of the tube interstice. Then the entire structure is furnace brazed. This currently used process requires many hours and costs tens of thousands of dollars. The manual application of the nickel powder and braze alloy is time-consuming and subject to inconsistencies. Manual rework would require refiring the entire nozzle to prevent localized stress concentrations. To prevent this the silver-palladium alloy paste is applied generously to avoid thin regions, and the excess is collected on the furnace floor. This excess results in higher raw material and recycling costs.

This braze filler paste dispensing operation is being automated with the use of the feature tracking sensor of this invention. There will be a significant reduction in the hours of labor and material costs through the use of an automatic positioning and precision metering system for dispensing braze filler mateials. Because of the size and flexibility of the unbrazed thrust chambers, traditional, preprogrammed paste dispensing paths are not adequate. The robot system will use different information from the feature tracking sensors to locate and track the tube interstices. Because of the use of sensor feedback, variations in the position of the chamber with respect to the robot will be accommodated with little or no manual teaching of the robot.

Figure 1:
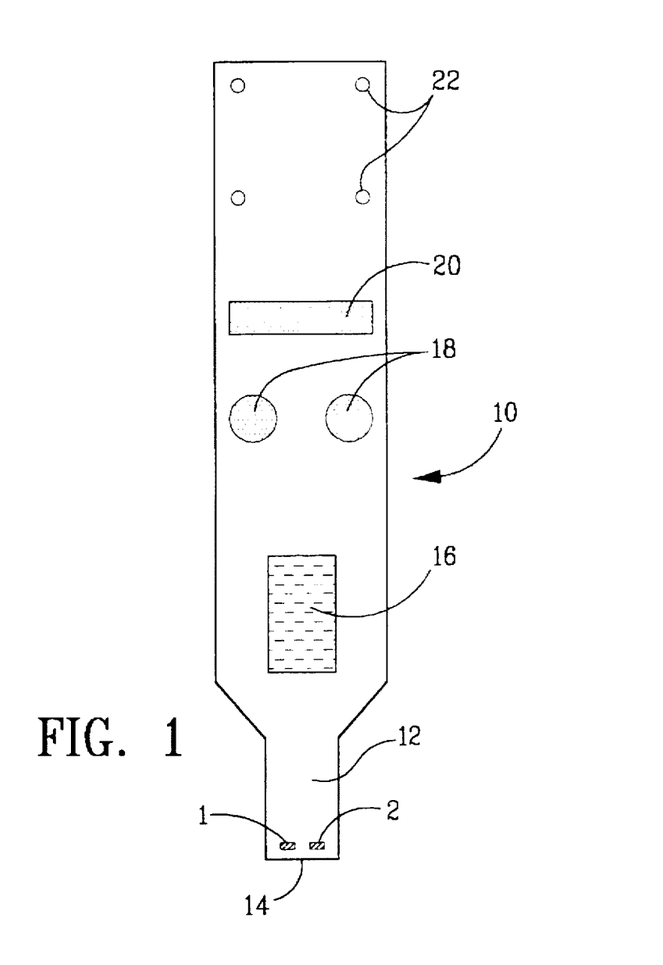
FIG. 1 is a side view of the four electrode seam tracking sensor.

The sensor developed for this application is shown in FIG. 1. The sensor 10 comprises an inexpensive five layer PC board with one integrated circuit 16 for buffering and charge amplification. The sensing elements comprise four rectangular capacitor electrodes with one pair on each side of the tab extension 12 at the lower end of the sensor 10. The two electrodes shown in this view are numbered 1 and 2 with corresponding electrodes 3 and 4 on the opposite side of the tab 14 but not shown in this view. The electrode pairs are located just above the bottom edge 14 of the tab 12 to maximize their response to pertubations in the electric fields they produce by nearby structural features. The principles of capacitive sensing are described in a related patent application entitled "A Non-Contact Capacitance Based Image Sensing Method and System" U.S. Ser. No. 07/514,051 by J. L. Novak and J. J. Wiczer, assigned to the assignee of this invention. This reference is incorporated by reference in its entirety.

Figure 2:
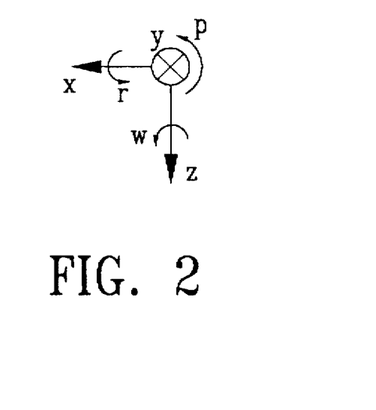
FIG. 2 is the orientation diagram associated with FIG. 1.
Figure 8:
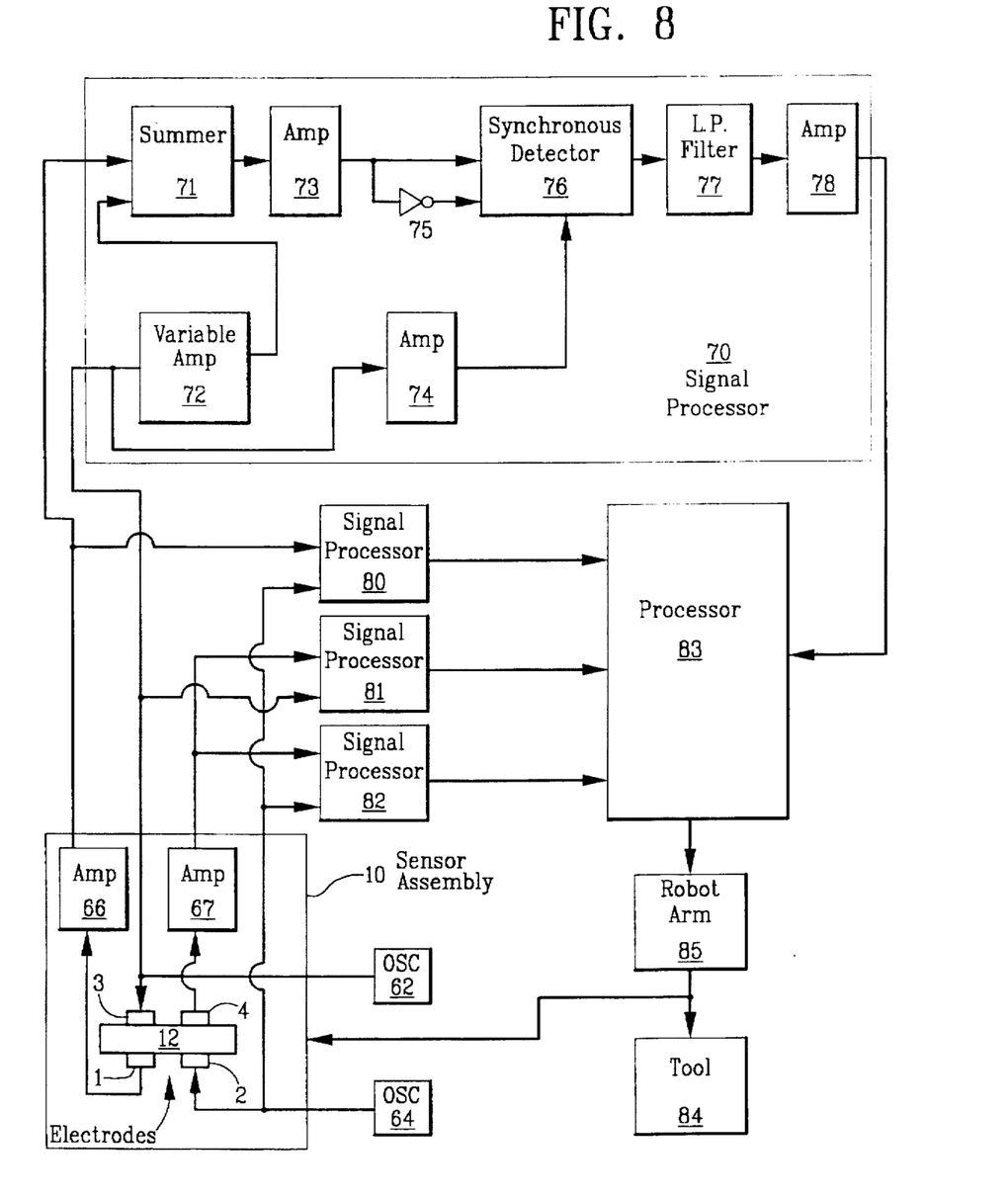
FIG. 8 is an electrical schematic diagram of the sensor system.

Power and output signals are carried by a ribbon connector 20 to remote signal conditioning electronics shown in FIG. 8. A different frequency input signal is input to each of electrodes 2 and 3 from remote oscillators via SMB coaxial connectors 18. The sensor 10 is mounted on a robot arm with fasteners through holes 22. FIG. 2 shows the orientation of the sensor relative to the seam feature. The pairs of electodes on each side of the tab 12 are aligned with the longitudinal or x-axis of the seam. The positive y-axis of the seam and the sensor is pointed into the paper while the z-axis is pointing downwards. The various rotational or orientational components about the x, y, and z axes are labelled r, p, and w respectively.

Figure 3:
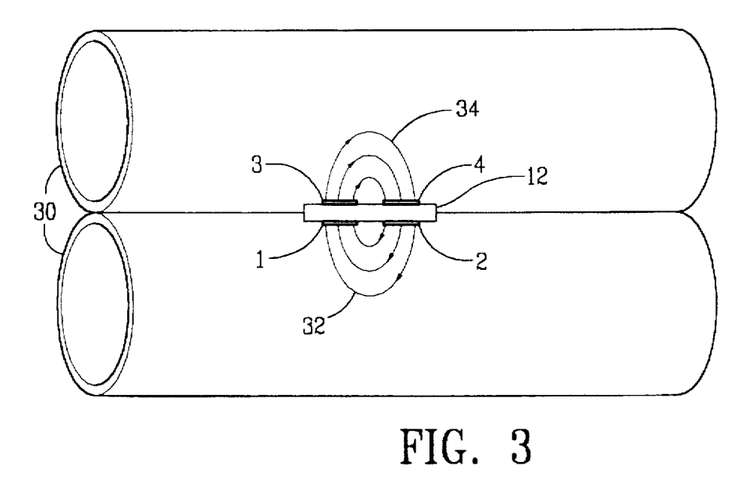
FIG. 3 is a top view of the tab portion of the sensor following a seam in the workpiece.
Figures 5, 6:
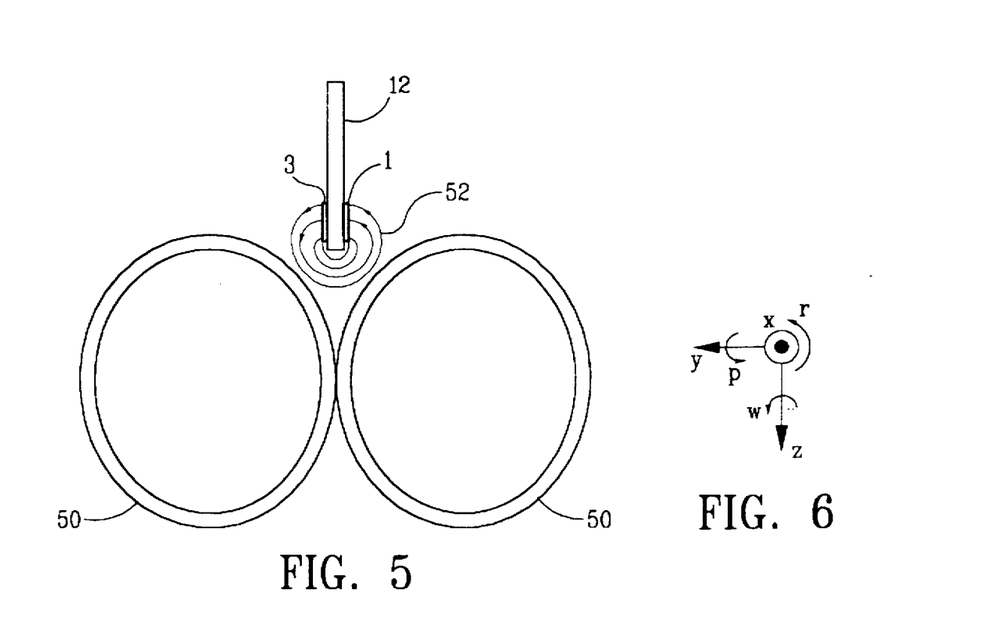
FIG. 5 is an end view of the tab portion of the sensor following a seam in the workpiece.
FIG. 6 is the orientation diagram associated with FIG. 5.

The sensor generates four electric fields that are perturbed by changes in the sensor position relative to a workpiece. Three of the sensing fields are indicated in FIG. 3 and 5. Changes in the electric field between the elecrode plates are detected as capacitance variations. The shape and extent of the electric fields are functions of the position and size of the electrodes. By varying the geometry of the electrode pairs, the field can be optimized for a particular application. For the seam tracking application, the size and placement of the electrodes has been optimized for locating and tracking the interstices associated with the typical rocket nozzle tubes.

Figure 4:
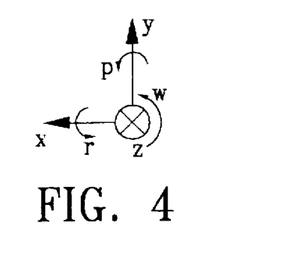
FIG. 4 is the orientation diagram associated with FIG. 3.

FIG. 3 is a top view of the sensor tracking the seam between two tubes 30. The sensor tab 12 with the four electrodes 1, 2, 3 and 4 is shown. Electrodes 2 and 3 operate as transmitters, and electrodes 1 and 4 as receivers. The arrows on the field lines 32 and 34 indicate transmission direction but not necessarily field polarity. FIG. 5 is an end view of the sensor tab 12 and the tubes 50, showing electrodes 1 and 3 and the associated field lines 52. The fields between the electrodes on one side extend primarily outward in the +y or −y direction, although there is a minor component in the z direction. Thus the 1-2 electrode pair and the 3-4 electrode pair are "side looking" (SL) sensors. The fields between electrodes 1-3 and 2-4 extend primarily downward in the +z direction. These will be referred to as the "downward looking" (DL) sensors. FIGS. 4 and 6 give orientation information for FIGS. 3 and 5 respectively.

Information about the rotation about the y-axis ($\Delta p$) can be obtained by subtracting the data from DL sensor 4-2 from that of DL sensor 1-3. All other influences on this sensor pair are common-mode and will be nulled by the subtraction. Control over this pitch rotation will keep the sensor correctly oriented relative to the normal to the plane of the workpiece.

Because of the geometry of the rocket nozzle, the tube interstices lie in a plane. By proper motion programming, $\Delta r$ (roll rotation about the x-axis) and $\Delta w$ (yaw rotation about the z-axis) can remain fixed and do not need to be sensed during the dispensing operation. A plane containing the axis of symmetry for the nozzle and the location of the interstice interior curved surface can be calculated, permitting predetermined rotation (if required) during travel. With $\Delta r$ and $\Delta w$ fixed with respect to the tube gap, the signal component corresponding to these perturbations will be constant. Thus, the differential signal between the SL sensors (1-2 minus 3-4) will provide deviations from true tracking in y, the differential signal between the DL sensors (1-3 minus 4-2) will indicate rotation about the y-axis ($\Delta p$), and the common mode signal from the DL sensors (1-3 plus 2-4) can be set to a fixed value to maintain a constant height (z) above the surface. However, other applications of this sensor might require different parameters to be sensed. Information regarding $\Delta w$, $\Delta r$, and $\Delta x$ could be easily extracted as well as other combinations.

The sensor was tested using a fixture representing the workpiece containing the interstices to be located and tracked. A combustion chamber was simulated with a flat bundle of ⅜ inch OD tubes approximately 3 feet long for the following experiments. The sensor tab 12 was oriented parallel to the interstice axis (x-axis). Data was collected as the sensor was moved perpendicularly to the seam axis in the y and z directions.

Because the electric fields at the DL sensors extend primarily along the z-axis, these sensors exhibit a greater sensitivity to changes in this distance than the SL sensors. These senors are used to control the motion of the robot toward the chamber surface. The measured dynamic range for the common-mode DL sensor signal along the z-axis is approximately 70 mm. Calibration parameters were determined by collecting data as the sensor was moved away from the simulated chamber surface.

Figure 7:
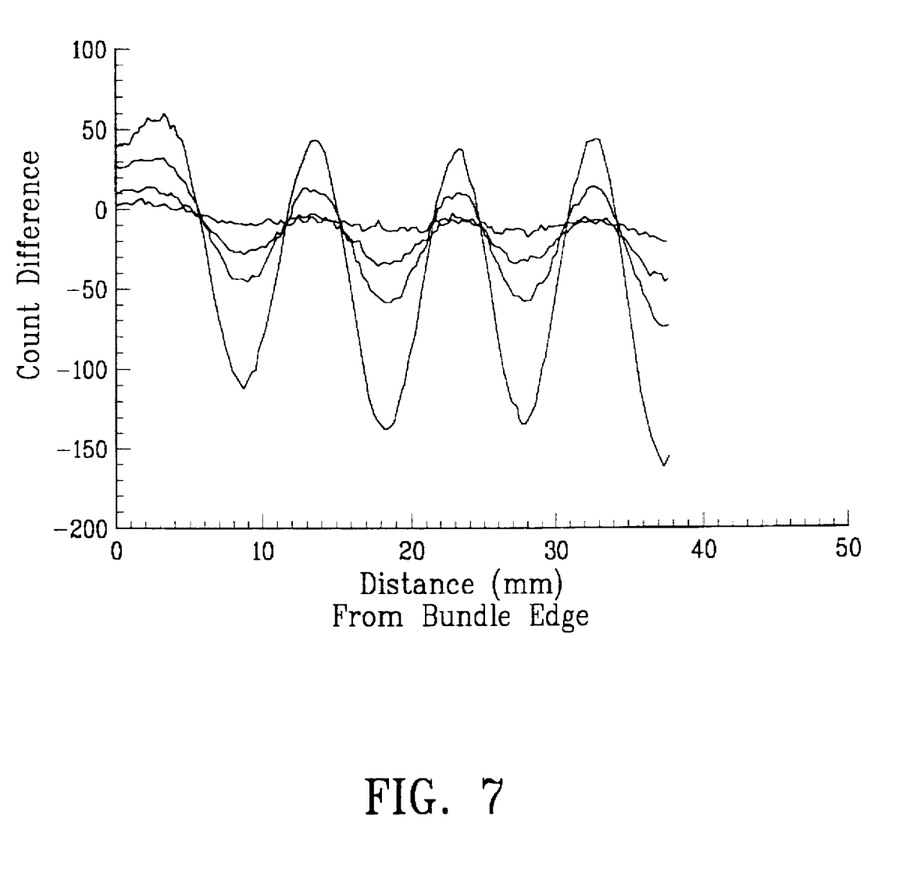
FIG. 7 is a graph showing the differential sensor output in the downwards direction as a function of lateral distance across the seams in the workpiece.

FIG. 7 shows a plot of the difference between the SL sensor signals as the sensor was scanned along the Y-axis of the tube bundle at distances from 0 to 4 mm above the surface. The numbers on the y-axis of the graph correspond to counts coming out of an analog to digital converter at the back end of the signal conditioning electronics described in more detail in conjunction with FIG. 8. The value of the difference signal goes to zero both at the centers of the interstices and at the tops of the tubes due to the symmetrical geometry at both locations. Plots of the sum of SL sensor signals, not shown, exhibit positive peaks at locations over the tops of the tubes and negative peaks at the interstices. The difference signal identifies the locations of symmetry, while the sum of the sensor signals identifies whether the location is a tube top or an interstice. This sensor information is used to precisely locate an interstice by directing the robot to move the sensor tip to zero the SL difference (i.e., balance the readings of the SL sensors) while maintaining a minimum value for the common-mode SL sensor signal.

FIG. 8 is an electrical schematic drawing of the sensor system. The two transmitting electrodes 2 and 3 mounted on tab 12 are driven at two different frequencies by oscillators 62 and 64. Using two frequencies allows continuous parallel sensing by the sensing electrodes 1 and 4 and their associated signal conditioning electronics 70, 80, 81, and 82 rather than having to time multiplex the signals if a single frequency with additional sensors were to be used.

The raw signal from electrode 1 contains information at the two frequencies of oscillators 62 and 64. This signal is buffered by charge amplifier 66 and is then fed into two signal processing sections 70 and 80. The four signal processing sections 70, 80, 81, and 82 are identical internally but are connected to different sensor and reference signals.

The sensor signal is fed into summer 71 along with the original oscillator signal which has been scaled using variable amplifier 72. Because the charge amplifier 66 inverts the sensor signal, the input to the wide bandwidth amplifier 73 can be adjusted to be zero when the sensor is in a fixed location relative to the workpiece by varying the output level of amp 74. This largely removes the system interference from the signal. When the sensor is in this reference position, most of the signal coming from the charge amplifier 66 is due to fixed and parasitic capacitances. By removing this constant signal from the output of the summer 71, the gain of the wide bandwidth amplifier 73 can be increased greatly, resulting in higher sensitivities.

The output of the wide bandwidth amplifier 73 goes to synchronous detector 76, both directly and through an inverter 75. The synchronous detector 76 is clocked by a clock generating circuit 74 that produces a clock signal from the original oscillator 62. The phase of this clock signal may be adjusted to compensate for any phase shifts that have occurred as a result of parasitic capacitances in the charge amplifier 66, the summer 71, the wide bandwidth amplifier 73, or the interconnections getween these stages. The phase may also be adjusted to permit operation of the sensor with nonmetallic materials or in situations where the feature to be tracked is surrounded by media other than air. For example, in some welding applications the parts to be welded lie beneath a layer of flux material. This material will result in a phase shift a the sensor which depends on the resistive and reactive components of the complex dielectric constant. Adjustment of the clock generating circuit 74 will permit accurate measurement of the electric field resulting from this configuration.

The output from the synchronous detector 76 is passed through a low-pass filter 77 and amplifier 78. The other branch of charge amplifier output 66 passes through an identical signal processing section 80 which is instead connected to oscillator 64. Thus the output of signal processing section 70 depends only on the electric field detected at electrode 1 due to oscillator 62 driving electrode 3, while the output of signal processing section 80 depends on the electric field at electrode 1 due to oscillator 64 driving electrode 2. Signal processing for electric fields detected at electrode 4 by charge amplifier 67 is performed in the same manner.

It should be noted that the signal processing techniques described in conjunction with FIG. 8 are very important to the successful operation of this embodiment. The variations in the electric fields due to changes in the location and orientation of the sensor with respect to the features are very small. Large amounts of parasitic capacitances and electrical interference tend to obscure the desired signal. By using the variable amplifier reference stage 72, this processing circuitry minimizes the effect of parasitic capacitances. The clock generating circuitry permits accurate adjustment of the phase of the detection signal, permitting compensation for phase shifts in the sensor or electronics as well as allowing the sensor to be used with nonmetallic materials or in dielectric media such as welding flux. In these cases, the sensor system measures the impedance, not only the capacitance between sensor electrodes. Each sensor signal would go to the signal processing stages with the clock generating circuits operating in quadrature to produce signals corresponding to the capacitive (reactive) and resistive parts of the complex impedance. Finally the synchronous detection circuitry 76 rejects all interference signals and noise which are not at the frequency of the oscillator 62 with the same phase (or in quadrature) as the output of the clock generating circuitry 74. This is especially important due to the typically large amounts of interference in manufacturing operations due to motors and other electrical equipment.

The conditioned signals output from 70, 80, 81, and 82 are then fed into a processor means 83 which adds or subtracts the sensed field signals to provide the location and orientation information for the sensor relative to the seam. The processing means also controls the motion of the robot arm 85 to which the sensor 10 and the tool 84 are attached as well as the sequence of steps necessary to lay down the brazing compound.

Figure 9:
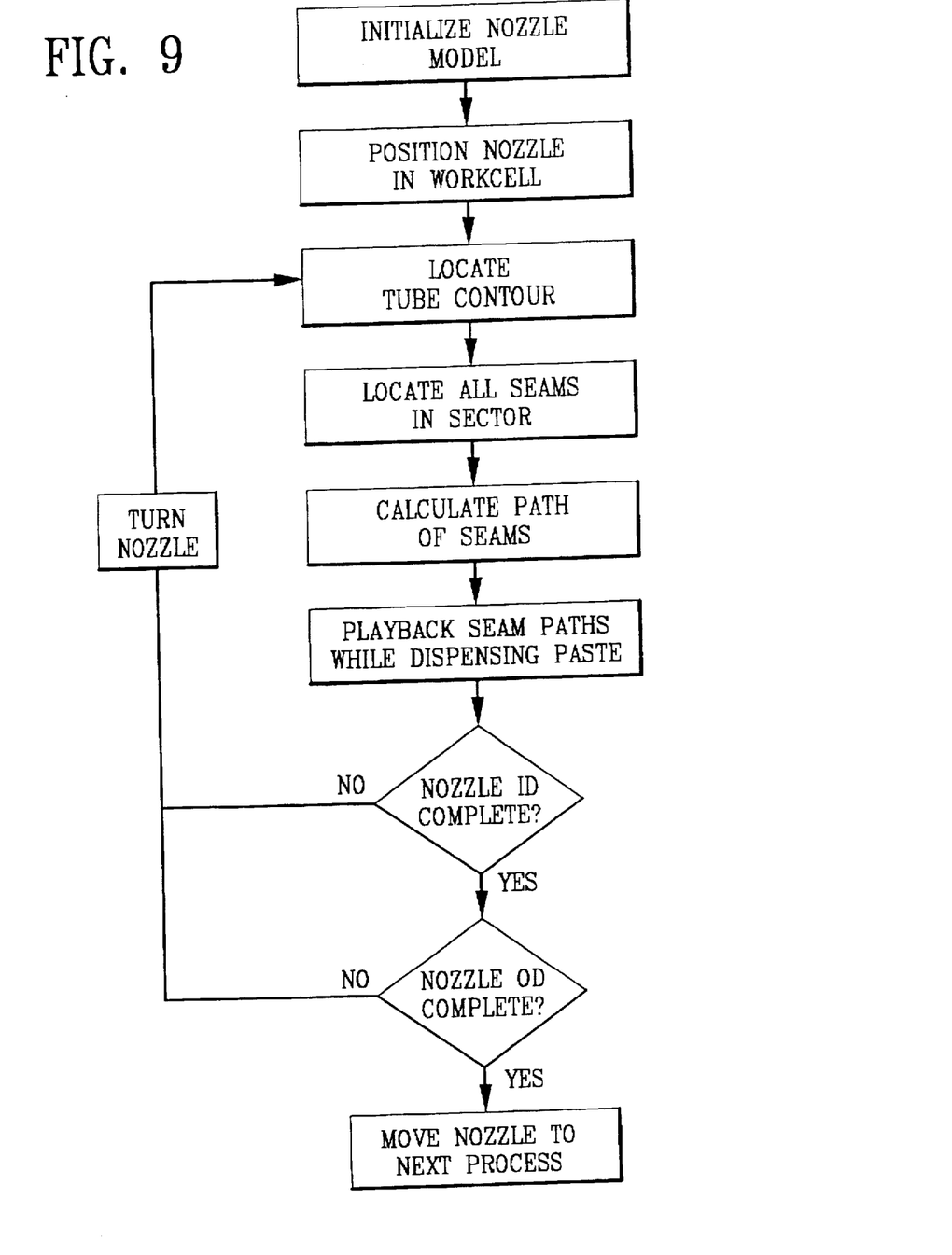
FIG. 9 is a flowchart showing the sequence of steps used to perform the brazing paste dispensing operation.

FIG. 9 is a diagram showing the sequence of steps involved in dispensing the brazing paste. The first step provides geometric information about the nozzle model to the processor 83. The second step locates the actual unbrazed tube assembly within the workcell and provides this information to the processor 83. The third step locks in to an individual seam at a known location. The next step uses the sensor to track all the seams in a sector of the nozzle. The next step calculates the geometry of the seam paths. The next step plays back the calculated paths while employing the tool to dispense the brazing paste. The next step is a decision point. If all of the seams on the inside of the nozzle are not completed, the sequence returns to the third step and locates a seam in an unfinished sector and proceeds from there. If the inside of the nozzle is complete, the sequence then restarts at the third step by beginning with the first seam sector on the outside of the nozzle. Once the outside of the nozzle is completed, the brazing paste dispensing operation is complete, and the nozzle moves on to the next step in its manufacture.

This sensor system uses differential measurements to "null out" variations due to improper seam tracking. This permits automatic compensation for relative changes in the shape and sizes of the gaps. The differential measurement also compensates for changes in temperature and the effects of small amounts of contamination on the probe. This sensor technology is inherently rugged, insensitive to lighting and surface contamination, and inexpensive, especially when compared to optical techniques such as structured lighting. This sensor will permit the robot to maintain relative orientation of the tool with respect to the interior nozzle surface, as well as the gaps.

The system described in the embodiment above can be readily extended into six degrees of freedom and is not limited to measuring only the $\Delta y$, $\Delta z$, and $\Delta p$ parameters. Straightforward extension of the design principles utilized above can result in a sensor embodiment such as the one shown in FIG. 10. This sensor can be used to detect all three locations and the three orientations, that is perturbations in the $\Delta x$, $\Delta y$, $\Delta z$, $\Delta r$, $\Delta p$, and $\Delta w$ directions and orientations. In addition, the signal processing sections described in conjunction with FIG. 8 could be extended to support four separate oscillators, permitting simultaneous collection of the twelve channels of sensor data. The perturbations would be measured using the electric fields given in Table 1 below.

Figure 10:
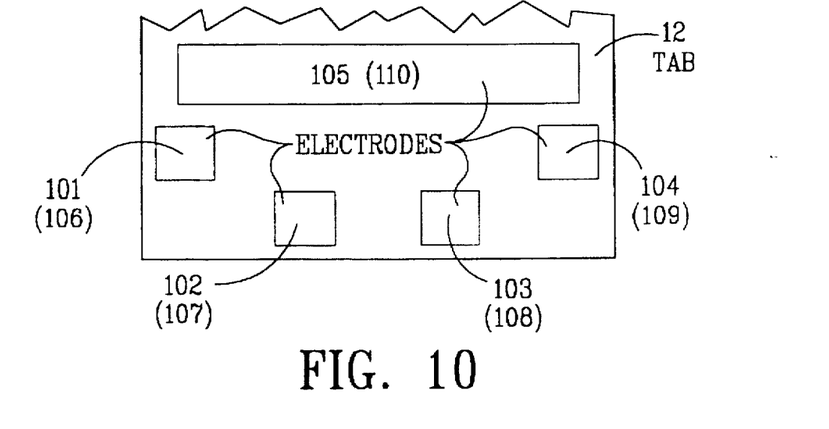
FIG. 10 is a side view of the tab portion of the sensor system that will measure up to six degrees of freedom relative to the feature on the workpiece.

FIG. 10 is an expanded version of the tab section shown in FIG. 1 with three more pads on each side of the tab 12, and its spatial orientation corresponds to that shown in FIG. 2. The pads on the printed circuit board are formed in the usual manner and serve as the electrodes which generate the electrical fields. Electrodes 101, 102, 103, 104, and 105 are on the side of the tab 12 facing the viewer. Electrodes 106, 107, 108, 109, and 110 are shown in parentheses to indicate that they are located on the opposite side of the tab 12 and directly behind electrodes 101, 102, 103, 103, and 105, respectively. The addition of electrodes 105 and 110 gives the capability to sense $\Delta r$, the roll about the x-axis (this is the feature axis).

TABLE 1

| Direction | Combination of Fields |
| --- | --- |
| $\Delta x$ | 101,106 minus 104,109 |
| $\Delta y$ | 102,103 minus 107,108 |
| $\Delta z$ | 102,107 plus 104,108 |
| $\Delta r$ | (105,101 plus 105,103) minus (110,107 plus 110,109) |
| $\Delta p$ | 102,107 minus 103,108 |
| $\Delta w$ | (101,102 plus 108,109) minus (106,107 plus 103,104) |

Additionally, since the sensor can recognize ridges and protusions as well as seams, it can be readily converted to track these features if the associated manufacturing process requires this capability. Hence the feature can be either an indentation such as a seam or a protusion so long as the surfaces on either side of the feature are reasonably symmetric. In most sensor applications it will be desirable that the sensor and/or its associated robotic tool be oriented normal to the local workpiece surface. Certain applications such as grinding or polishing may require that the tool be oriented at a non-perpendicular angle relative to the local workpiece surface. Such applications are easily accomodated by modifications to the robotic controller.

I claim:

1. Apparatus for tracking a feature on a workpiece comprising:

at least two pairs of electrodes disposed on a planar mount oriented parallel to the axis of the feature and above the workpiece with one electrode in each pair operating as a transmitter of an electric field and the other electrode in each pair operating as a receiver of the field;

means to drive each of the transmitting electrodes at a separate frequency;

means to combine the signals from the receiver electrodes to provide information indicative of the position of the mount relative to the feature; and means to drive the mount in response to the position information.

2. The apparatus of claim 1 further comprising:

means to drive each of the transmitting electrodes at a separate frequency;

inverting charge amplifier means to initially buffer the signal output from each receiver electrode; and means for cancelling signals due to undesired impedances at the frequency of a transmitting electrode comprising variable amplifier means which separately amplify each of the outputs of the means to drive each transmitting electrode to a level sufficient to null the output of the inverting charge amplifier means when the planar mount is in a predefined position relative to the workpiece.

3. The apparatus of claim 2 further including means to adjust for phase shifts in the fields sensed by each of the receiving electrodes comprising:

synchronous detector means connected to the amplified output and the inverted amplified output of the undesired impedance signal cancellation means and to the output of a clock generating circuit wherein the clock generating circuit contains means to provide an adjustable delay to the signal received from the means to drive the transmitting electrode such that the delay may be adjusted to compensate for phase shifts between the signal transmitted by the transmitting electrode and the receiving electrode in the output of the synchronous detector means.

4. The apparatus of claim 3 wherein the clock generating circuit is operated in quadrature.

5. The apparatus of claim 3 further including means to adjust for undesired phase shifts in the fields sensed by each of the receiving electrodes comprising:

synchronous detector means connected to the amplified output and the inverted amplified output of the receiving electrode and to the output of a clock generating circuit wherein the clock generating circuit contains means to provide an adjustable delay to the signal received from the means to drive the transmitting electrode such that the delay may be adjusted to compensate for undesired phase shifts between the signal transmitted by the transmitting electrode and the receiving electrode in the output of the synchronous detector means.

6. The apparatus of claim 1 wherein there are sufficient pairs of electrodes to measure up to six degrees of freedom in position relative to the coordinate system of the feature and the position of the planar mount.

7. The apparatus of claim 1 wherein the means to drive the mount comprises a robotic arm to which tool means are also attached.

8. The apparatus of claim 1 wherein the feature is a protusion.

9. The apparatus of claim 1 wherein the feature is an indentation or a hole.

10. Apparatus for tracking a feature on a workpiece comprising:

at least two pairs of electrodes disposed on a planar mount oriented parallel to the axis of the feature and above the workpiece with one electrode in each pair operating as a transmitter and the other electrode in each pair operating as a receiver;

means to drive each of the transmitting electrodes at a separate frequency;

inverting charge amplifier means to initially buffer the signal output from each receiver electrode;

means for cancelling signals due to undesired impedances at the frequency of a transmitting electrode comprising variable amplifier means which separately amplify each of the outputs of the means to drive each transmitting electrode to a level sufficient to null the output of the inverting charge amplifier means when the planar mount is in a predefined position relative to the workpiece;

means to combine the signals from the receiver electrodes after undesired impedance signal cancellation to provide information indicative of the location of the mount relative to the feature; and means to drive the mount in response to the location information.

11. The apparatus of claim 10 further including means to adjust for phase shifts in the fields sensed by each of the receiving electrodes comprising:

synchronous detector means connected to the amplified output and the inverted amplified output of the undesired impedance signal cancellation cancellation means and to the output of a clock generating circuit wherein the clock generating circuit provides an adjustable delay to the signal received from the means to drive the transmitting electrode such that the delay may be adjusted to compensate for phase shifts between the signal transmitted by the transmitting electrode and the receiving electrode in the output of the synchronous detector means.

12. The apparatus of claim 11 wherein the clock generating circuit is operated in quadrature.

13. Apparatus for tracking a feature on a workpiece comprising:

mount means having a relatively thin planar region oriented generally perpendicular to the surface (z-axis) of the workpiece and parallel to the longitudinal axis of the feature (x-axis);

first, second, third, and fourth electrode means wherein the first and second electrode means are located on one side of the lowermost extension of the planar region and third and fourth electrode means are located on the opposite side of the planar region and directly behind the first and second electrode means respectively;

means to create an oscillating electric potential at one of the electrode means at each side of the planar region and means to sense the oscillating electric potential at the other of the electrode means at each side;

means to create a first combined signal indicative of deviations of the mount means in a direction perpendicular (z-axis) to the surface of the workpiece comprising means to determine the sum of the electric field between the transmitting electrode means on the one side and the sensing electrode means on the opposite side and the electric field between the transmitting electrode means on the opposite side and the sensing electrode means on the one side; and means to drive the mount means such that a predetermined value for the first combined signal is maintained.

14. The apparatus of claim 13 further including means to create a second combined signal indicative of deviations of the mount means in a direction perpendicular (y-axis) to the axis of the feature (x-axis) comprising means to determine the difference between the field between the first and second electrode means and the field between the third and fourth electrode means; and means to drive the mount means in the y-axis direction to produce a minimum in the second combined signal.

15. The apparatus of claim 13 further including means to create a third combined signal indicative of angular displacement about the y-axis comprising means to determine the difference between the field between the transmitting electrode means on the one side and the sensing electrode means on the opposite side and the field between the transmitting electrode means on the opposite side and the sensing electrode means on the one side; and means to drive the mount means to maintain a predetermined angular orientation within the plane defined by the x-axis and the z-axis relative to the local workpiece surface.

16. The apparatus of claim 13 wherein each transmitting electrode means transmits at a different frequency.

17. The apparatus of claim 13 wherein the means to drive the mount comprises a robotic arm to which tool means are also attached.

18. The apparatus of claim 13 wherein the feature is a seam.

19. The apparatus of claim 13 wherein the feature is a linear protrusion.

* * * * *